US011926298B2

(12) United States Patent
Kondo et al.

(10) Patent No.: US 11,926,298 B2
(45) Date of Patent: Mar. 12, 2024

(54) BRAKE DEVICE

(71) Applicant: SUBARU CORPORATION, Tokyo (JP)

(72) Inventors: Yujiro Kondo, Tokyo (JP); Tomonori Imaizumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/989,990

(22) Filed: Nov. 18, 2022

(65) Prior Publication Data

US 2023/0174027 A1  Jun. 8, 2023

(30) Foreign Application Priority Data

Dec. 3, 2021  (JP) .................................. 2021-197321

(51) Int. Cl.
*B60T 7/06* (2006.01)
*B60T 13/52* (2006.01)
*G05G 1/40* (2008.04)

(52) U.S. Cl.
CPC ................ *B60T 7/06* (2013.01); *B60T 13/52* (2013.01); *G05G 1/40* (2013.01)

(58) Field of Classification Search
CPC ............ G05G 1/30; G05G 1/40; G05G 1/405; G05G 1/44; G05G 1/445; G05G 1/46; B60T 7/04; B60T 7/06; B60T 13/52
See application file for complete search history.

(56) References Cited

U.S. PATENT DOCUMENTS

| 5,855,143 A * | 1/1999 | Ewing | G05G 1/40 |
| | | | 74/512 |
| 6,321,617 B1 * | 11/2001 | Schwyn | G05G 1/405 |
| | | | 74/512 |
| 11,052,856 B1 * | 7/2021 | Kim | B60R 21/09 |

(Continued)

FOREIGN PATENT DOCUMENTS

| EP | 0982645 A2 * | 3/2000 | | G05G 1/405 |
| FR | 2943437 A1 * | 9/2010 | | B60T 11/18 |

(Continued)

OTHER PUBLICATIONS

Machine Translation of KR-20030055585-A.*
Machine Translation of EP-0982645-A2.*
Machine Translation of FR-2943437-A1.*

*Primary Examiner* — Vicky A Johnson
(74) *Attorney, Agent, or Firm* — MCGINN I.P. LAW GROUP, PLLC.

(57) ABSTRACT

A brake device includes a brake pedal, an input rod, a master cylinder, a guide rail, a slider, and a coupling arm. The brake pedal is rotatable using an arm rotary shaft disposed on one end of a pedal arm used as a fulcrum. A pedal force input to the brake pedal is transmitted to the input rod as a thrust. The master cylinder is configured to generate a brake hydraulic pressure responsive to the thrust input to the input rod. The guide rail is disposed on the pedal arm and extends along a longitudinal direction of the pedal arm. The slider is coupled to the pedal arm via the guide rail and is movable on the guide rail. The coupling arm has a first end rotatably coupled to the slider and a second end rotatably coupled to the input rod. The second end is different from the first end.

4 Claims, 7 Drawing Sheets

(56) References Cited

U.S. PATENT DOCUMENTS

| | | | |
|---|---|---|---|
| 2005/0115355 A1* | 6/2005 | Stender | B60K 23/02 |
| | | | 74/560 |
| 2007/0068321 A1* | 3/2007 | Song | G05G 1/405 |
| | | | 74/512 |
| 2015/0101446 A1* | 4/2015 | Shand | G05G 1/506 |
| | | | 74/512 |
| 2015/0107402 A1* | 4/2015 | Leem | G05G 5/03 |
| | | | 74/512 |
| 2021/0284106 A1* | 9/2021 | Kim | B60T 7/06 |

FOREIGN PATENT DOCUMENTS

| | | | | |
|---|---|---|---|---|
| JP | H 09-328061 A | 12/1997 | | |
| KR | 20030055585 A | * | 7/2003 | B60T 13/52 |

\* cited by examiner

US 11,926,298 B2

BRAKE DEVICE

CROSS-REFERENCE TO RELATED APPLICATIONS

The present application claims priority from Japanese Patent Application No. 2021-197321 filed on Dec. 3, 2021, the entire contents of which are hereby incorporated by reference.

BACKGROUND

The disclosure relates to a brake device including a mechanism that can change a lever ratio of a brake pedal.

In general, a brake device mounted in a vehicle such as a motor vehicle has a brake booster (vacuum booster) that is a toggle amplifying a brake hydraulic pressure using a negative pressure or the like generated in an engine or the like.

For such a brake device, it is desirable to take measures to address a malfunction such as a situation in which it is impossible to accumulate an appropriate negative pressure in the brake booster. To address this, for example, Japanese Unexamined Patent Application Publication (JP-A) No. H09-328061 discloses a technique for changing a position of a rotary spindle of a brake pedal so that a pedal ratio (lever ratio), which is represented by a ratio of a rotation radius of the pedal to a rotation radius of a coupling member between the pedal and a clevis, of the brake pedal can be changed. In addition, according to the technique disclosed in JP-A H09-328061, a position of a rotary shaft of the brake pedal is switched over to a position closer to the coupling member between the pedal and the clevis to increase the lever ratio so that a high thrust can be input to an input rod with respect to a brake pedal force during the malfunction of the brake booster.

SUMMARY

An aspect of the disclosure provides a brake device. The brake device includes a brake pedal, an input rod, a master cylinder, a guide rail, a slider, and a coupling arm. The brake pedal is rotatable using an arm rotary shaft disposed on one end of a pedal arm used as a fulcrum. A pedal force input to the brake pedal is transmitted to the input rod as a thrust. The master cylinder is configured to generate brake hydraulic pressure responsive to the thrust input to the input rod. The guide rail is disposed on the pedal arm and extends along a longitudinal direction of the pedal arm. The slider is coupled to the pedal arm via the guide rail and is movable on the guide rail. The coupling arm has a first end rotatably coupled to the slider and a second end rotatably coupled to the input rod. The second end is different from the first end.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

The technique disclosed in JP-A H09-328061 employs configurations of increasing a lever ratio by reducing an effective length of a brake pedal. Owing to this, it is often difficult to effectively leverage an entire length of the brake pedal during a malfunction.

Furthermore, in a brake device of this type, it is desirable to variably change a relationship between a brake pedal force and a thrust during the malfunction or in response to a request of a driver who drives a vehicle so that brake operation feeling can be changed.

It is desirable to provide a brake device capable of flexibly changing the relationship between a pedal force input to a brake pedal and a thrust transmitted to an input rod.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
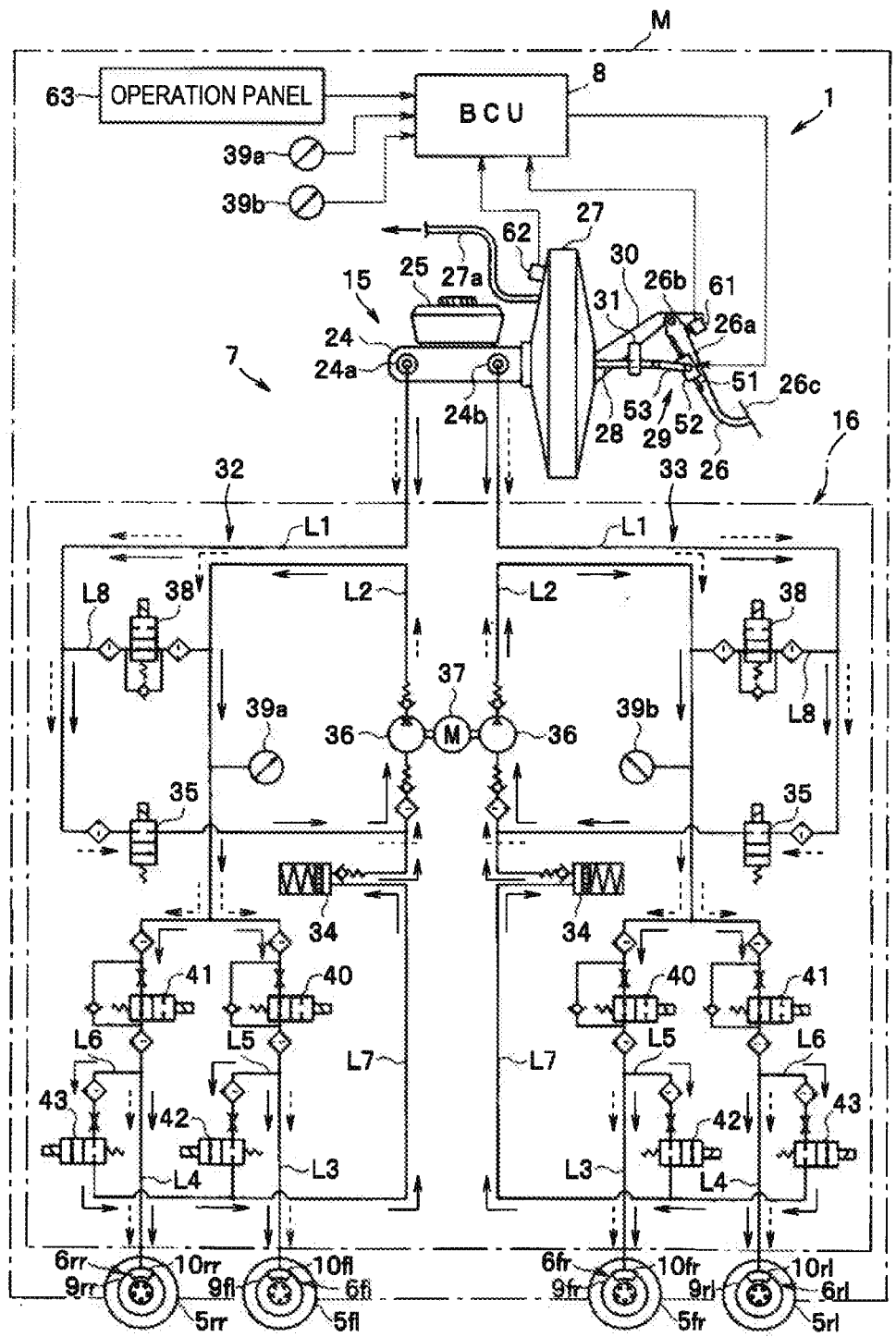
FIG. 1 is a schematic configuration diagram of a brake device mounted in a vehicle.

FIG. 1 is a schematic configuration diagram of a brake device mounted in a vehicle. A brake device 1 illustrated in FIG. 1 is mounted in a vehicle M such as an automobile. This brake device 1 has friction brakes 6*fl*, 6*fr*, 6*rl*, and 6*rr* provided in left and right front wheels 5*fl* and 5*fr* and left and right rear wheels 5*rl* and 5*rr* of the vehicle N, respectively, a brake actuator 7 that supplies a hydraulic operating pressure to the friction brakes 6*fl*, 6*fr*, 6*rl*, and 6*rr*, and a brake control unit (BCU) 8 that controls the brake actuator 7. In one embodiment, the BCU 8 may serve as a "controller".

The friction brakes 6*fl*, 6*fr*, 6*rl*, and 6*rr* have elements such as disc rotors 9*fl*, 9*fr*, 9*rl*, and 9*rr* and calipers 10*fl*, 10*fr*, 10*rl*, and 10*rr* provided at the wheels 5*fl*, 5*fr*, 5*rl*, and 5*rr*, respectively. The calipers 10*fl*, 10*fr*, 10*rl*, and 10*rr* have brake pads (not illustrated) engaged with the disc rotors 9*fl*, 9*fr*, 9*rl*, and 9*rr* as frictional engagement elements, respectively.

The brake actuator 7 is coupled to the calipers 10*fl*, 10*fr*, 10*rl*, and 10*rr* of the friction brakes 6*fl*, 6*fr*, 6*rl*, and 6*rr*.

The brake actuator 7 is configured with principal members including a brake pedal mechanism 15 and a brake hydraulic pressure circuit 16 coupled to the brake pedal mechanism 15.

The brake pedal mechanism 15 has a master cylinder 24, a reservoir tank 25 attached to the master cylinder 24, a brake pedal 26, and a brake booster 27 interposed between the crake pedal 26 and the master cylinder 24.

The reservoir tank 25 stores a pressure medium (fluid).

A negative pressure pipe line 27a is coupled to the brake booster 27. A negative pressure source such as an engine intake manifold (not illustrated) is coupled to the negative pressure pipe line 27a. The brake pedal 26 is provided continuously with the brake booster 27 via an input rod 28. Furthermore, a slider mechanism 29, to be described later, is interposed between the input rod 28 and the brake pedal 26.

A pedal force input to the brake pedal 26 is transmitted to the input rod 28 as a thrust (pressing force) in a longitudinal axis direction of the input rod 28. The brake booster 27 generates a brake assist force for the thrust transmitted to the input rod 28, with a negative pressure supplied from the negative pressure source used as a power source. That is, the brake booster 27 amplifies the thrust transmitted to the input rod 28. The brake booster 27 then transmits the amplified thrust (total force of the thrust transmitted to the input rod 28 and the brake assist force) to the master cylinder 24.

As a result, the master cylinder 24 generates a master cylinder pressure (brake hydraulic pressure) responsive to the thrust transmitted to the input rod 28. The brake hydraulic pressure generated in the master cylinder 24 is transmitted to the brake hydraulic pressure circuit 16.

The master cylinder 24 is in communication with the calipers 10fl, 10fr, 10rl, and 10rr provided at the wheels 5fl, 5fr, 5rl, and 5rr via the brake hydraulic pressure circuit 16.

This brake hydraulic pressure circuit 16 is configured with two systems of hydraulic pressure lines, i.e., a first hydraulic pressure circuit 32 and a second hydraulic pressure circuit 33. The brake hydraulic pressure circuit 16 according to the present embodiment is a cross-pipe (X pipe) system in which the first hydraulic pressure circuit 32 and the second hydraulic pressure circuit 33 are disposed to cross each other in diagonal directions of the vehicle M. That is, in the brake hydraulic pressure circuit 16 according to the present embodiment, the first hydraulic pressure circuit 32 is coupled to the left front wheel and right rear wheel calipers 10fl and 10rr disposed in one of the diagonal directions of the vehicle M, while the second hydraulic pressure circuit 33 is coupled to the right front wheel and left rear wheel calipers 10fr and 10rl disposed in the other diagonal direction of the vehicle M.

The first hydraulic pressure circuit 32 and the second hydraulic pressure circuit 33 are identical in configurations. Therefore, the first hydraulic pressure circuit 32 and the second hydraulic pressure circuit 33 will be described simply hereinafter while identical elements are denoted by the same reference signs, as appropriate. Furthermore, the configurations of the first and second brake hydraulic pressure circuits 32 and 33 will be described hereinafter while it is assumed that a master cylinder 24-side is upstream and a calipers 10fl, 10fr, 10rl, and 10rr-side is downstream with reference to a flow from the master cylinder 24 to the calipers 10fl, 10fr, 10rl, and 10rr for the sake of convenience.

First and second feeding/discharging ports 24a and 24b provided at the master cylinder 24 are coupled to the hydraulic pressure circuits 32 and 33, respectively. For example, upstream sides of first hydraulic lines L1 configuring the hydraulic pressure circuits 32 and 33 are coupled to the feeding/discharging ports 24a and 24b, respectively. In addition, a downstream side of each of the first hydraulic lines L1 is coupled to a middle of a second hydraulic line L2.

An upstream side of the second hydraulic line L2 is coupled to a low-pressure accumulator 34 serving as an accumulation member.

A downstream side of the second hydraulic line L2 is branched into and coupled to a third hydraulic line L3 and a fourth hydraulic line L4. Furthermore, downstream sides of the hydraulic lines L3 and L4 are coupled to the calipers 10fl and 10rr (10fr and 10rl) that actuate the friction brakes 6fl and 6rr (6fr and 6rl) provided at the wheels 5fl and 5rr (5fr and 5rl) and that generate braking forces (friction braking forces) in the wheels 5fl and 5rr (5fr and 5rl), respectively.

On the other hand, upstream sides of fifth and sixth hydraulic lines L5 and L6 are coupled to middles of the third and fourth hydraulic lines L3 and L4, respectively. Downstream sides of these fifth and sixth hydraulic lines L5 and L6 are coupled to a seventh hydraulic line L7, and a downstream side of this seventh hydraulic line L7 is coupled to the low-pressure accumulator 34.

A gate-in valve 35 is interposed in the first hydraulic line L1, while a hydraulic pressure pump 36 is interposed in the second hydraulic line L2 downstream of the first hydraulic line L1. Furthermore, the hydraulic pressure pumps 36 of the first and second hydraulic pressure circuits 32 and 33 are coupled to a common electric motor 37.

A drive shaft of each hydraulic pressure pump 36 is coupled to the electric motor 37 so that hydraulic pressures generated by the two hydraulic pressure pumps 36 pulsate in opposite phases.

Furthermore, a bypass coupling is established between the first hydraulic line L1 on an upstream side of the gate-in valve 35 and the second hydraulic line L2 on a downstream side of the hydraulic pressure pump 36 via an eighth hydraulic line L8. A bypass valve 38 is interposed in this eighth hydraulic line L8. Moreover, a first brake hydraulic pressure sensor 39a (second brake hydraulic pressure sensor 39b) is interposed in the second hydraulic line L2 downstream of the eighth hydraulic line L8. Examples of this brake hydraulic pressure sensor 39a (39b) include a hydraulic pressure sensor that detects a hydraulic pressure of a brake fluid acting on the second hydraulic line L2. Furthermore, pressure valves 40 and 41 are interposed in the third and fourth hydraulic lines L3 and L4, while pressure reducing valves 42 and 43 are interposed in the fifth and sixth hydraulic lines L5 and L6, respectively.

Examples of these valves 35, 38, and 40 to 43 include an electromagnetic solenoid valve. The valves 35, 38, and 40 to 43 and the electric motor 37 are driven and controlled by the BCU 8.

In the present embodiment, each of the bypass valve 38 and the pressure valves 40 and 41 is configured with, for example, a normally open electromagnetic solenoid valve. In addition, each of the gate-in valve 35 and the pressure reducing valves 42 and 43 is configured with a normally closed electromagnetic solenoid valve.

Therefore, in normal times when the ECU 8 does not control the valves 35, 38, and 40 to 43 and the electric motor 37, the brake hydraulic pressure generated in the master cylinder 24 in response to a driver's amount of depression on the brake pedal 26 is basically, directly supplied to each caliper 10.

On the other hand, in the vehicle M including, for example, a drive assist device, not illustrated, the ECU 8 controls the electric motor 37 to be driven, the gate-in valve 35 to be open, and the bypass valve 38 to be closed as necessary. As a result, the pressure medium pressurized in the master cylinder 24 or the pressure medium supplied directly from the reservoir tank 25 is pressurized to a predetermined brake hydraulic pressure via the hydraulic pressure pump 36 and then supplied from the second hydraulic line L2 to the third and fourth hydraulic lines L3 and L4.

Furthermore, during braking force cooperative control for cooperation with a brake such as a regenerative brake or an engine brake, the BCU 8 drives and controls the pressure reducing valves 42 and 43, the electric motor 37, and the like as necessary to reduce the brake hydraulic pressure. As a result, each friction braking force is controlled to a braking force responsive to a distributed amount of a predetermined braking force.

Next, detailed configurations of the brake pedal mechanism 15 will be described with reference to FIGS. 2 to 5 while attention is paid to the slider mechanism 29.

A pedal bracket 30 extending in a vehicle cabin direction of the vehicle M is fixed to the brake booster 27.

One end (upper end) of a pedal arm 26a in the brake pedal 26 is rotatably coupled to a tip end of this pedal bracket 30 via an arm rotary shaft 26b. That is, the brake pedal 26 is rotatably supported by the pedal bracket 30 with the arm rotary shaft 26b serving as a fulcrum. In addition, a foot pedal 26c is provided on the other end (lower end) of the pedal arm 26a.

Furthermore, one end of a rod guide 31 is fixed to a middle of the pedal bracket 30 by fastening a bolt or the like.

A rod insertion hole 31a is provided in the other end of this rod guide 31. The input rod 28 extending from the brake booster 27 is inserted into the rod insertion hole 31a. The input rod 28 is thereby permitted to make a linear motion with respect to the brake booster 27 and prohibited from making a rocking motion with respect to the brake booster 27. That is, the rod guide 31 permits the input rod 28 to move forward and backward in a direction along a central axis of the input rod 28 and prohibits the input rod 28 from a rocking motion in a direction crossing the central axis of the input rod 28.

The slider mechanism 29 is configured with a guide rail 51 provided in a middle of the pedal arm 26a, a slider 52 movable on the guide rail 51, and a coupling arm 53 coupling the slider 52 to the input rod 28.

Figure 5:
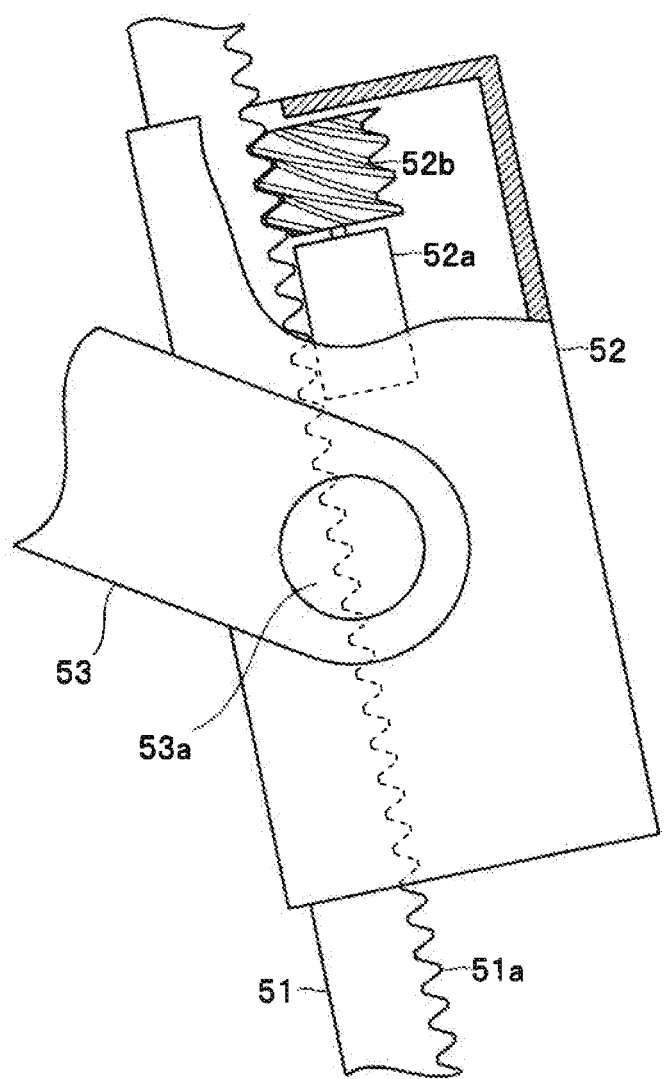
FIG. 5 is a schematic configuration diagram of a slider mechanism including a partial exploded view of the slider.

The guide rail 51 is disposed on a back side of the pedal arm 26a (toeboard side of the vehicle M). In addition, the guide rail 51 extends along a longitudinal direction of the pedal arm 26a. As illustrated in FIG. 5, this guide rail 51 is provided with a rack gear 51a.

As illustrated in FIG. 5, the slider 52 internally has a motor 52a serving as an actuator and a worm gear 52b fixed to a rotary shaft of the motor 52a.

The motor 52a is configured with, for example, a stepping motor. This motor 52a is driven and controlled by the BCU 8.

Furthermore, the worm gear 52b is engaged with the rack gear 51a of the guide rail 51. The worm gear 52b thereby transmits a driving force of the motor 52a to the rack gear 51a.

Therefore, the slider 52 moves on the guide rail 51 when the motor 52a is driven on the basis of a control signal from the ECU 8. The slider 52 is then held at a position on the guide rail 51 when the motor 52a is stopped.

One end of the coupling arm 53 is rotatably coupled to the slider 52 via a first rotary shaft 53a.

In addition, the other end of the coupling arm 53 is rotatably coupled to a tip end of the input rod 28 via a second rotary shaft 53b.

As a result, the coupling arm 53 couples the slider 52 (pedal arm 26a) to the input rod 28 while the slider 52 is permitted to move on the guide rail 51. Furthermore, the slider 52 is held at any position on the guide rail 51 and the rod guide 31 prohibits the input rod 28 from making a rocking motion. As a result, the coupling arm 53 transmits the pedal force when the driver depresses the brake pedal 26 to the input rod 28 as the thrust.

In the brake pedal mechanism 15 configured as described above, the brake pedal 26 causes the arm rotary shaft 26b to serve as a fulcrum, the foot pedal 26c as a point of lever, and the first rotary shaft 53a to serve as a point of application. The pedal force input to the brake pedal 26 is thereby converted into the thrust at a predetermined lever ratio Lr and the thrust is transmitted to the input rod 28.

In such a brake pedal mechanism 15, the first rotary shaft 53a moves in proportion to the movement of the slider 52 on the guide rail 51. The brake pedal mechanism 15 can thereby change the lever ratio Lr of the brake pedal 26.

Here, the lever ratio Lr of the brake pedal 26 according to the present embodiment is defined by the following Equation (1) while it is assumed, for example, that a length from the arm rotary shaft 26b to the foot pedal 26c is Lp and a length from the arm rotary shaft 26b to the first rotary shaft 53a is La.

$$Lr = Lp/La \tag{1}$$

Therefore, when the pedal force input to the foot pedal 26c is assumed as Fp, a thrust Fin transmitted to the input rod 28 is obtained by the following Equation (2).

$$Fin = Fp \cdot Lr = Fp \cdot (Lp/La) \tag{2}$$

Figure 2:
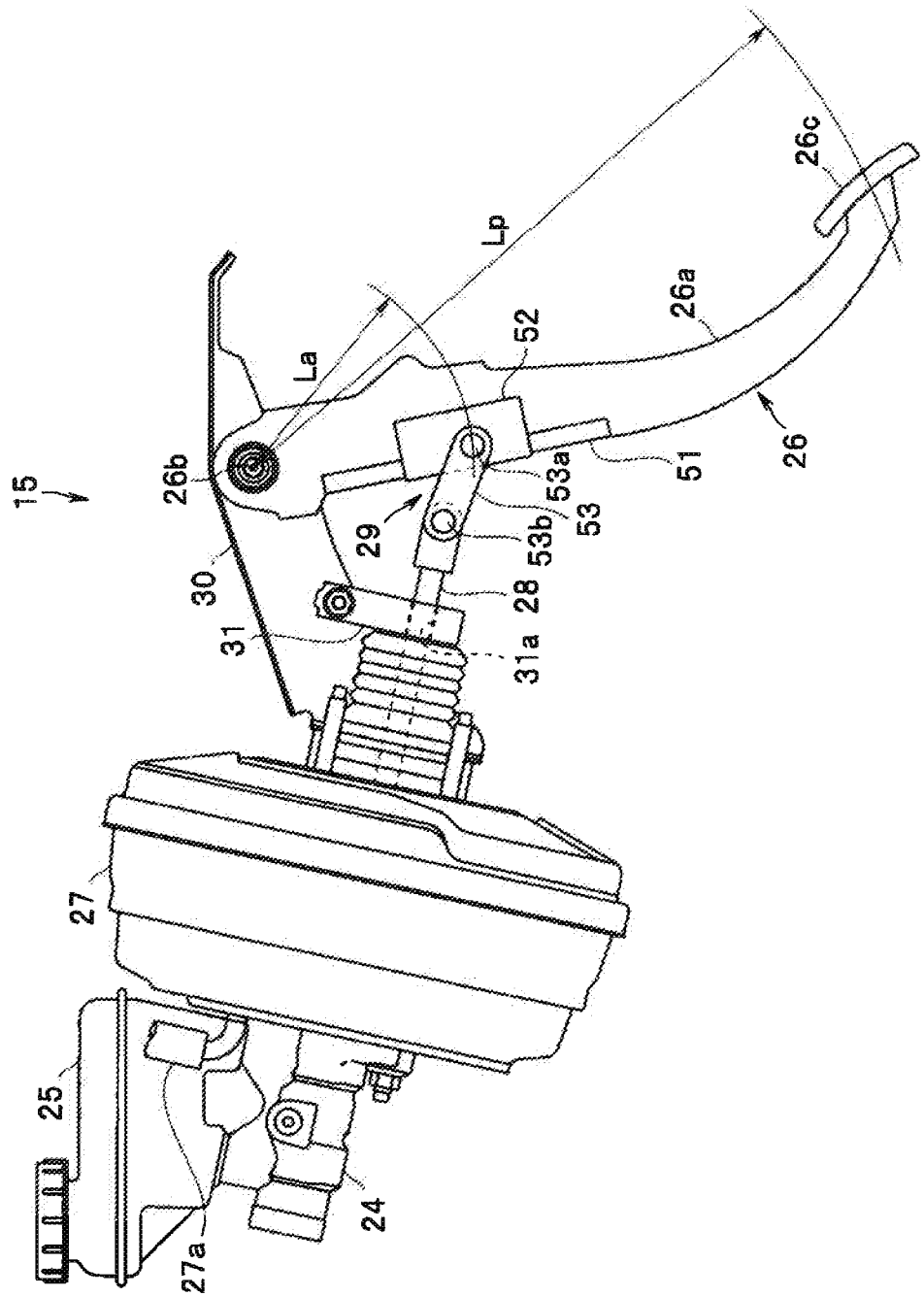
FIG. 2 is a side view of a brake pedal mechanism.

As illustrated in, for example, FIG. 2, a center on the guide rail 51 is set as a neutral position (reference position) of the slider 52. At this neutral position, a reference lever ratio Lf is set.

Figure 3:
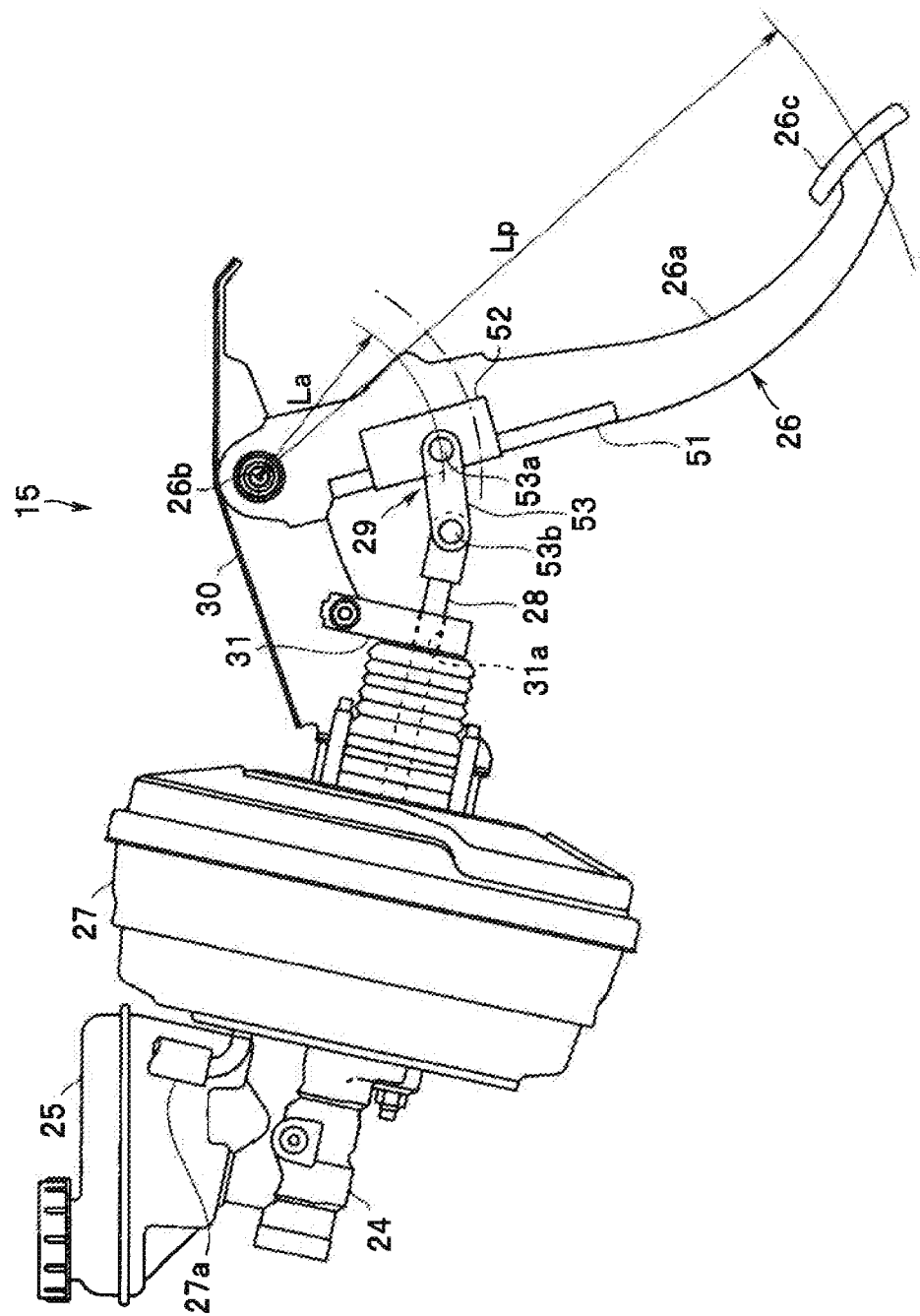
FIG. 3 is a side view of the brake pedal mechanism when a slider is moved to a position closer to pedal rotary shaft.

By contrast, as illustrated in, for example, FIG. 3, when the slider 52 moves from the neutral position toward the arm rotary shaft 26b, the length Lp remains unchanged and the length La is reduced. Therefore, when the slider 52 moves from the neutral position toward the arm rotary shaft 26b, the lever ratio Lr becomes relatively high compared with when the slider 52 is at the neutral position. The driver can thereby perform a brake operation with a relatively low pedal force. That is, with an increase in the lever ratio Lr, the thrust Fin input to the input rod 28 becomes relatively high compared with the pedal force Fp transmitted to the brake pedal 26. In other words, the brake operation for generating a desired braking force (brake hydraulic pressure) can be realized with a low pedal force although a pedal stroke is longer than that when the slider 52 is at the neutral position.

Figure 4:
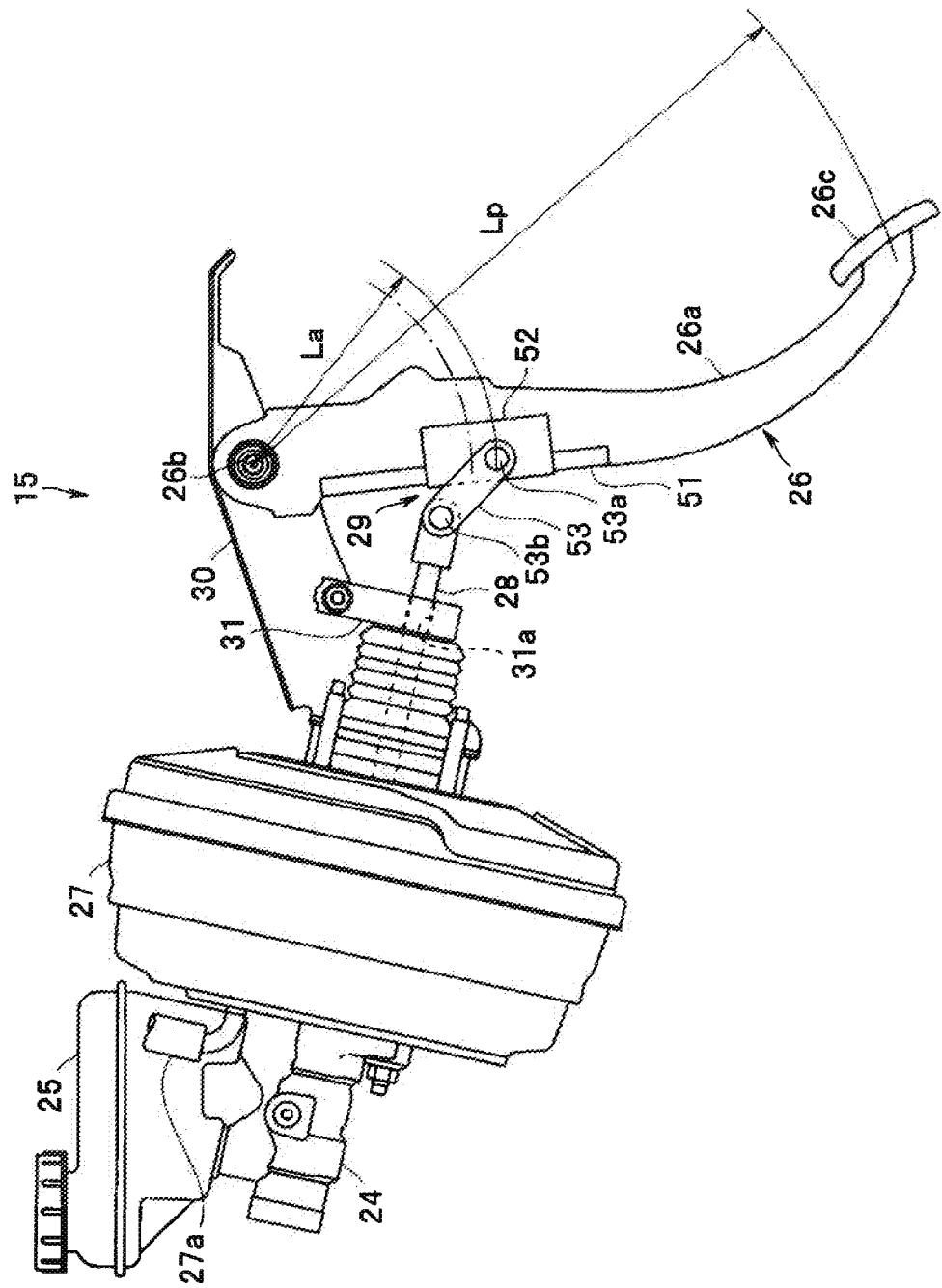
FIG. 4 is a side view of the brake pedal mechanism when the slider is moved to a position closer to a foot pedal.

On the other hand, as illustrated in, for example, FIG. 4, when the slider 52 moves from the neutral position toward the foot pedal 26c (opposite side to the arm rotary shaft 26b), the length Lp remains unchanged and the length La is increased. Therefore, when the slider 52 moves toward the foot pedal 26c from the neutral position, the lever ratio Lr becomes relatively low compared with when the slider 52 is at the neutral position. The driver is thereby to perform a brake operation with a relatively high pedal force. That is, with a decrease in the lever ratio Lr, the thrust Fin input to the input rod 28 becomes relatively low compared with the pedal force Fp transmitted to the brake pedal 26. In other words, the brake operation for generating the desired braking force (brake hydraulic pressure) can be realized with a shorter pedal stroke than when the slider 52 is at the neutral position; however, a higher pedal force is to be used for the brake operation.

In this way, in the brake pedal mechanism 15 according to the present embodiment, the slider mechanism 29 can freely change operation characteristics for the brake pedal 26 (relationship between the pedal force and the thrust).

As illustrated in FIG. 1, the first and second brake hydraulic pressure sensors 39a and 39b described above, a brake switch 61, a negative pressure sensor 62, and an operation panel 63 are coupled to an input side of the BCU 8.

The brake switch 61 is configured with a switch that is turned on when the driver depresses the brake pedal 26. The negative pressure sensor 62 detects a negative pressure (booster pressure Pb) introduced from the negative pressure source to the brake booster 27. Furthermore, the operation panel 63 that can set any operation characteristics (i.e., lever ratio Lr) for the brake pedal 26. In one embodiment, the operation panel 63 may serve as a "setting member".

The BCU 8 controls the slider mechanism 29 on the basis of input signals from these elements.

When the booster pressure Pb detected by the negative pressure sensor 62 is, for example, lower than a preset threshold Pbth, the BCU 8 determines that the brake booster 27 may malfunction.

In another example, when the brake switch 61 is turned on but a brake hydraulic pressure Ph detected by the first and second brake hydraulic pressure sensors 39a and 39b is lower than a preset threshold Phth, the BCU 8 determines that the brake booster 27 may malfunction.

In addition, while determining such a malfunction, the BCU 8 moves the slider 52 to a pedal-force reducing position set closer to the arm rotary shaft 26b rather than the neutral position.

Furthermore, when the ECU 8 determines that the brake booster 27 may not malfunction and any lever ratio Lr is set by the operation panel 63, the ECU 8 moves the slider 52 to a change request position responsive to the lever ratio Lr.

Figure 6:
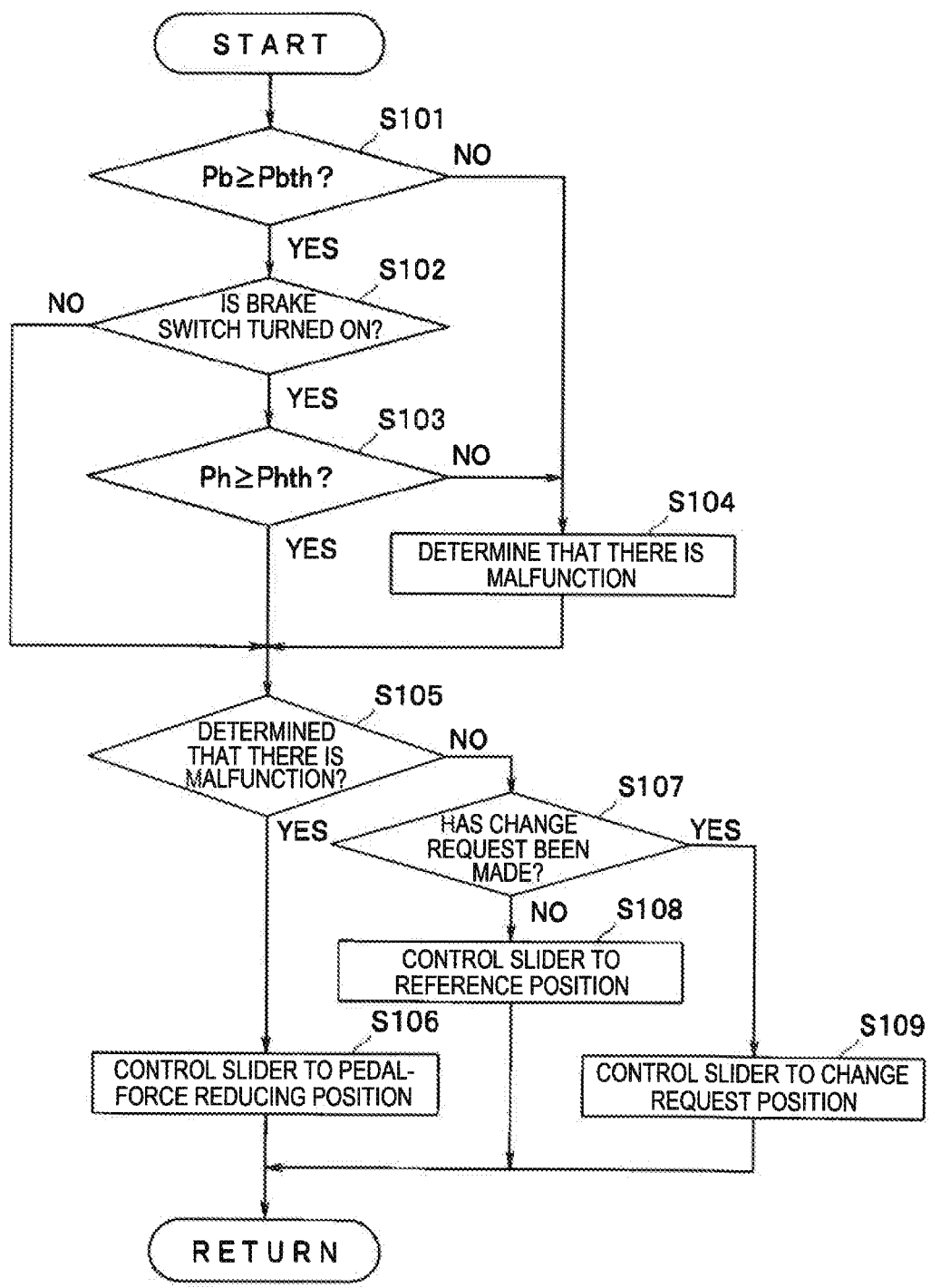
FIG. 6 is a flowchart illustrating a slider position control routine.

Next, position control over the slider 52 on the guide rail 51 will be described with reference to a flowchart of a slider position control routine illustrated in FIG. 6.

This routine is repeatedly executed per set time. When the routine gets started, the ECU 8 determines whether the booster pressure Pb is equal to or higher than the preset threshold Pbth on the basis of a signal from the negative pressure sensor 62 in Step S191. That is, the ECU 8 checks whether the booster pressure Pb sufficient to amplify the thrust transmitted to the input rod 28 is accumulated in the brake booster 27.

When determining that the booster pressure Pb lower than the threshold Pbth in Step S101, the ECU 8 goes to Step S104.

On the other hand, when determining that the booster pressure Pb is equal to or higher than the threshold Pbth in Step S101, the ECU 8 goes to Step S102.

In Step S102, the BCU 8 checks whether the brake switch 61 is turned on, i.e., whether the driver is depressing the brake pedal 26.

When determining that the brake switch 61 is turned off in Step S102, the BCU 8 goes to Step S105.

On the other hand, when determining that the brake switch 61 is turned on in Step S102, the ECU 8 goes to Step S103.

In Step S103, the ECU 8 determines whether the brake hydraulic pressure Ph is equal to or higher than the preset threshold Phth on the basis of signals from the first and second brake hydraulic pressure sensors 39a and 39b.

When determining that the brake hydraulic pressure Ph is equal to or higher than the threshold Phth, i.e., the appropriate brake hydraulic pressure Ph is generated for the driver's brake operation in Step S103, the BCU 8 goes to Step S105.

On the other hand, when determining that the brake hydraulic pressure Ph is lower than the threshold Phth, i.e., the appropriate brake hydraulic pressure Ph is not generated despite the driver's brake operation in Step S103, the BCU 8 goes to Step S104. A case where the brake hydraulic pressure Ph is lower than the threshold Phth may be assumed to be, for example, a case where the brake assist force sufficient for the thrust is not generated due to some malfunction of the brake booster 27 although the booster pressure Pb is appropriately generated.

When going to Step S104 from Step S101 or S103, the ECU 8 determines some malfunction in the brake booster 27 in Step S104 and then goes to Step S105.

When going to Step S105 from Step S102 or S104, the ECU 8 checks whether it has been determined that there is a malfunction in the brake booster 27.

When it has been determined that there is a malfunction in the brake booster 27, the BCU 8 goes to Step S106 from S105. After moving the slider 52 to the pedal-force reducing position set closer to the arm rotary shaft 26b rather than the neutral position in Step S106, the ECU 8 exits the routine.

On the other hand, when it has not been determined that there is a malfunction in the brake booster 27, the BCU 8 moves to Step S107 from Step S105.

In Step S107, the BCU 8 checks whether a change request of the lever ratio Lr for the brake pedal 26 has been made by the driver on the basis of the signal from the operation panel 63.

When determining that the change request to the lever ratio Lr has not been made by the driver in Step S107, the BCU 8 goes to Step S108. After controlling the slider 52 to the neutral position in Step S108, the BCU 8 exits the routine.

On the other hand, when determining that the change request of the lever ratio Lr has been made in Step S107, the BCU 8 goes to Step S109. After controlling the slider 52 to a position responsive to the lever ratio Lr to which the change request is issued in Step S109, the BCU 8 exits the routine.

According to such an embodiment, the brake device 1 includes: the guide rail 51 provided in the pedal arm 26a and extending along the longitudinal direction of the pedal arm 26a; the slider 52 coupled to the pedal arm 26a via the guide rail 51 and movable on the guide rail 51; and the coupling arm 53 having one end rotatably coupled to the slider 52 and the other end rotatably coupled to the input rod 28.

It is thereby possible to freely change the relationship between the pedal force Fp input to the brake pedal 26 and the thrust Fin transmitted to the input rod 28.

That is, the brake device 1 changes a position of the point of application of the brake pedal 26 to any position by moving the slider 52; thus, the brake device 1 can change the lever ratio Lr of the brake pedal 26 to any lever ratio.

In this case, the brake device 1 changes the position of the slider 52 on the guide rail 51, thus changing the lever ratio Lr. Therefore, even after changing the lever ratio Lr, it is possible to leverage the entire length of the brake pedal 26 effectively.

Furthermore, when the brake booster 27 malfunctions, e.g., when the negative pressure (booster pressure Pb) introduced to the brake booster 27 is lower than the preset threshold Pbth, the brake device 1 moves the slider 52 toward the arm rotary shaft 26b to reduce the lever ratio Lr. It is thereby possible to generate the brake hydraulic pressure with a relatively low pedal force Fp even when an appropriate assist force is not generated for the thrust transmitted to the input rod 28.

Moreover, the brake device 1 sets the desired lever ratio Lr on the basis of an operation input to the operation panel 63 and moves the slider 52 to the position responsive to the set lever ratio Lr on the guide rail 51. It is thereby possible to realize operation characteristics of the brake pedal 26 that match the driver's preferential operation feeling.

Furthermore, in the brake device 1, the rod guide 31 interposed between the brake booster 27 and the slider mechanism 29 permits the input rod 28 to move forward and backward in the direction along the central axis of the input rod 28 and prohibits the input rod 28 from making the rocking motion. It is thereby possible to accurately transmit the pedal force Fp input to the brake pedal 26 to the input rod 28 as the thrust even when the slider mechanism 29 is interposed between the brake pedal 26 and the input rod 28.

Here, in the embodiment described above, the BCU 8 is configured with a well-known microcomputer including a CPU, a RAM, a ROM a nonvolatile memory, and the like, and peripherals. Fixed data and the like such as programs executed in the CPU and data tables, are stored in the ROM in advance. It is noted that all or part of the features of a processor may be configured with a logic circuit or an analog circuit and that processing of various programs may be implemented by an electronic circuit such as an FPGA.

The disclosure described in the embodiment so far is not limited to the mode of the embodiment. Furthermore, various modifications could be carried out without departing from the concept of the disclosure when the disclosure is carried out.

Figure 7:
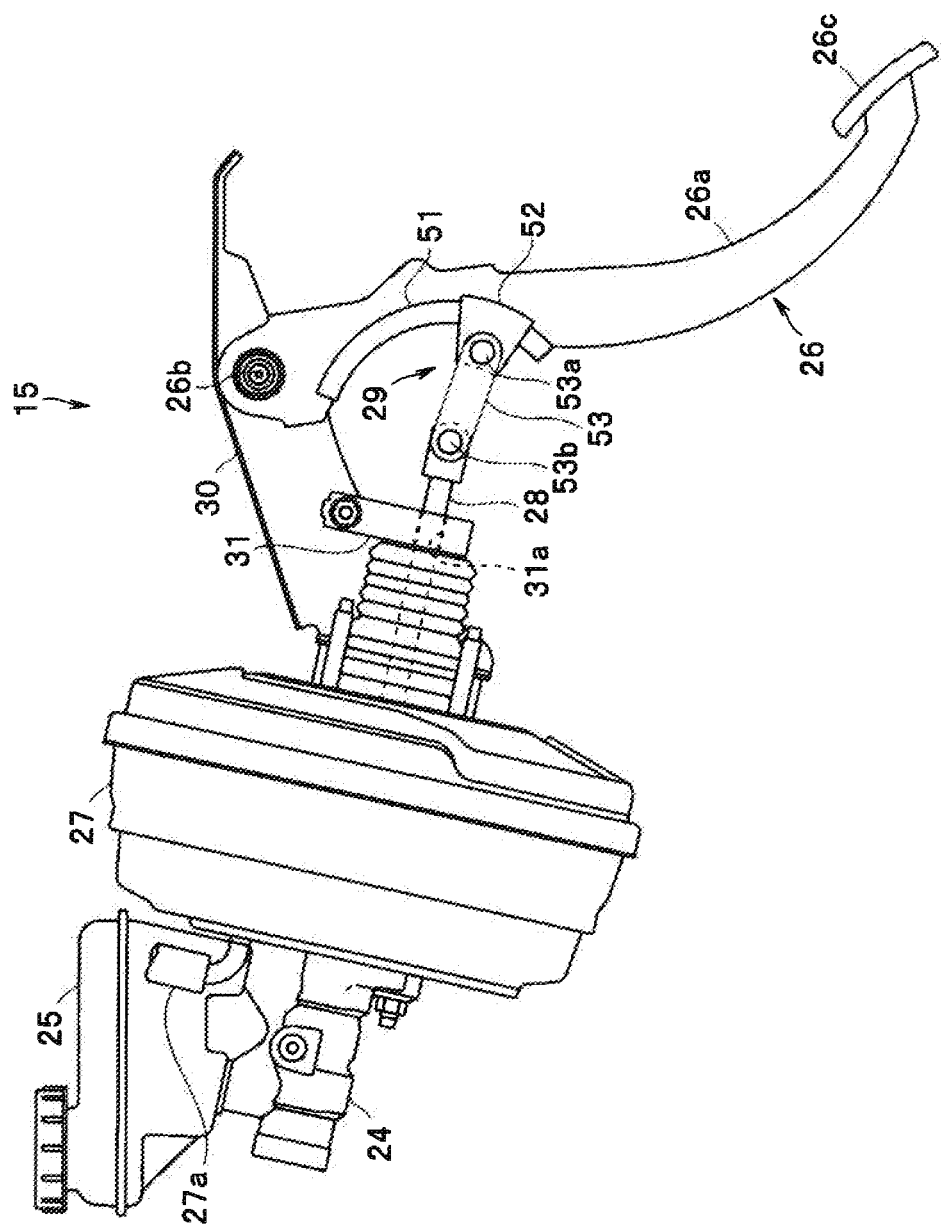
FIG. 7 is a side view of a brake pedal mechanism according to a modified example.

As illustrated in, for example, FIG. 7, the guide rail 51 may be formed into a circular arc shape around the second rotary shaft 53b. Forming the guide rail 51 in this way makes it possible to keep constant an inclination of the brake pedal 26 at no load even when the lever ratio Lr is changed.

Moreover, each embodiment encompasses the disclosure in various stages; thus, various aspects of the disclosure could be extracted by appropriately combining disclosed elements.

For example, let it be assumed that several elements are removed from all elements described in the embodiments. When the problems mentioned can be solved and the effects mentioned can be obtained, the configurations from which the elements are removed could be extracted as an aspect of the disclosure.

The invention claimed is:

1. A brake device comprising:
a brake pedal rotatable using an arm rotary shaft disposed on one end of a pedal arm used as a fulcrum;
an input rod to which a pedal force input to the brake pedal is transmitted as a thrust;
a master cylinder configured to generate a brake hydraulic pressure responsive to the thrust input to the input rod;
a guide rail disposed on the pedal arm and extending along a longitudinal direction of the pedal arm;
a slider coupled to the pedal arm via the guide rail and movable on the guide rail;
a coupling arm comprising a first end rotatably coupled to the slider, and a second end rotatably coupled to the input rod, the second end being different from the first end;
a negative pressure brake booster configured to increase the thrust transmitted to the input rod;
a negative pressure sensor configured to detect a negative pressure introduced to the brake booster; and
a controller configured to control a moving position of the slider relative to the guide rail;
wherein the controller is configured such that, in a case where the negative pressure detected by the negative pressure sensor is lower than a preset threshold, the controller moves the slider toward the arm rotary shaft.

2. The brake device according to claim 1, further comprising
a setting member configured to set operation characteristics for the brake pedal,
wherein the controller is configured to move, in a case where the negative pressure detected by the negative pressure sensor is equal to or higher than the preset threshold, a position of the slider on the guide rail to a position responsive to the set operation characteristics.

3. The brake device according to claim 1, further comprising a rod guide configured to guide the input rod,
wherein the rod guide is configured to allow the input rod to move forward and backward in a direction along a central axis of the input rod, and prohibit the input rod from making a rocking motion in a direction crossing the central axis of the input rod.

4. The brake device according to claim 2, further comprising a rod guide configured to guide the input rod,
wherein the rod guide is configured to allow the input rod to move forward and backward in a direction along a central axis of the input rod, and prohibit the input rod from making a rocking motion in a direction crossing the central axis of the input rod.

* * * * *